Aug. 5, 1969   P. H. ROSSITER   3,459,121
SLURRY FEEDER
Filed March 14, 1966   7 Sheets-Sheet 4
*FIG_4_*
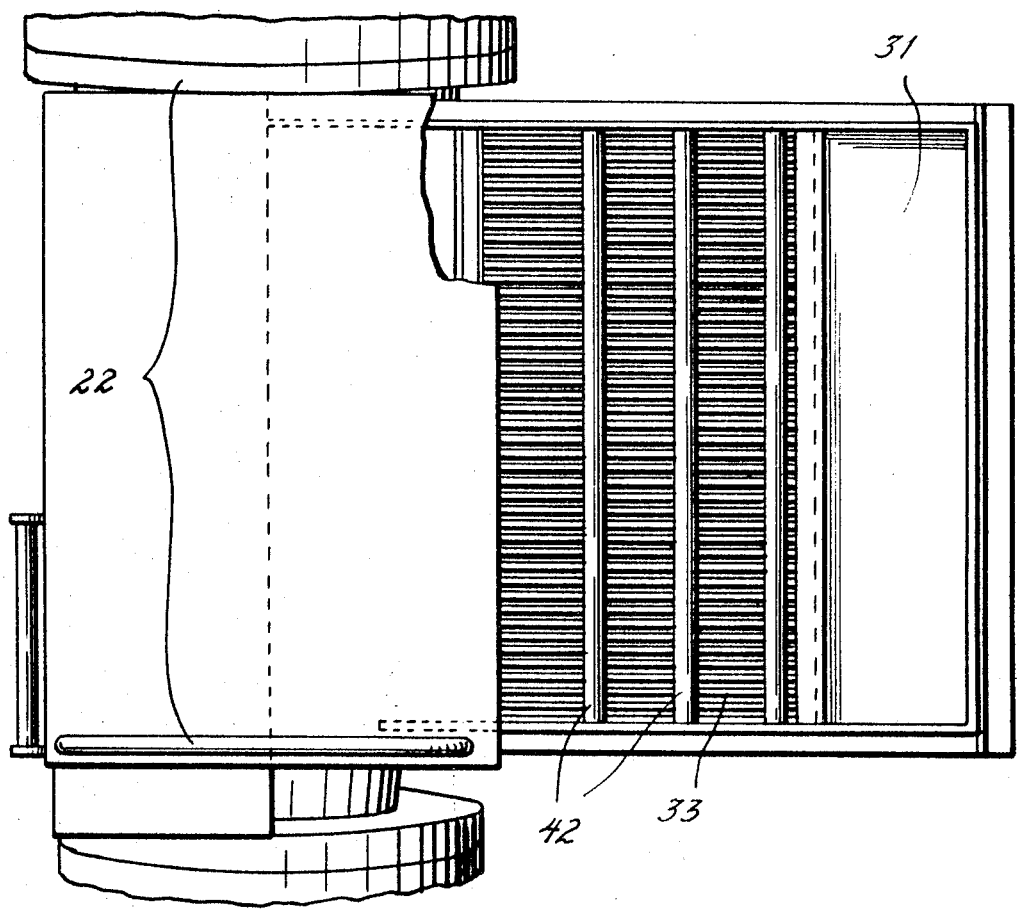
INVENTOR.
*Paul H. Rossiter,*
BY
*Paul & Paul*
ATTORNEYS.

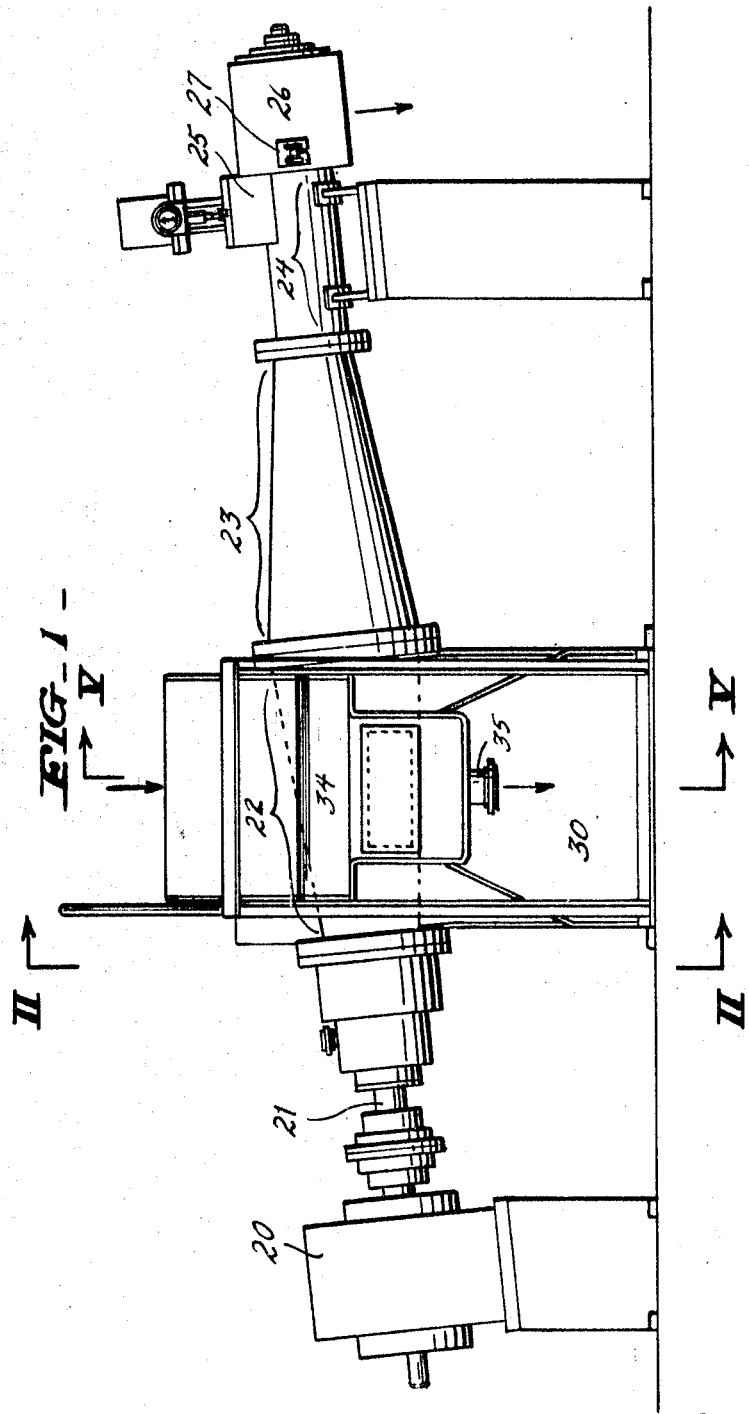

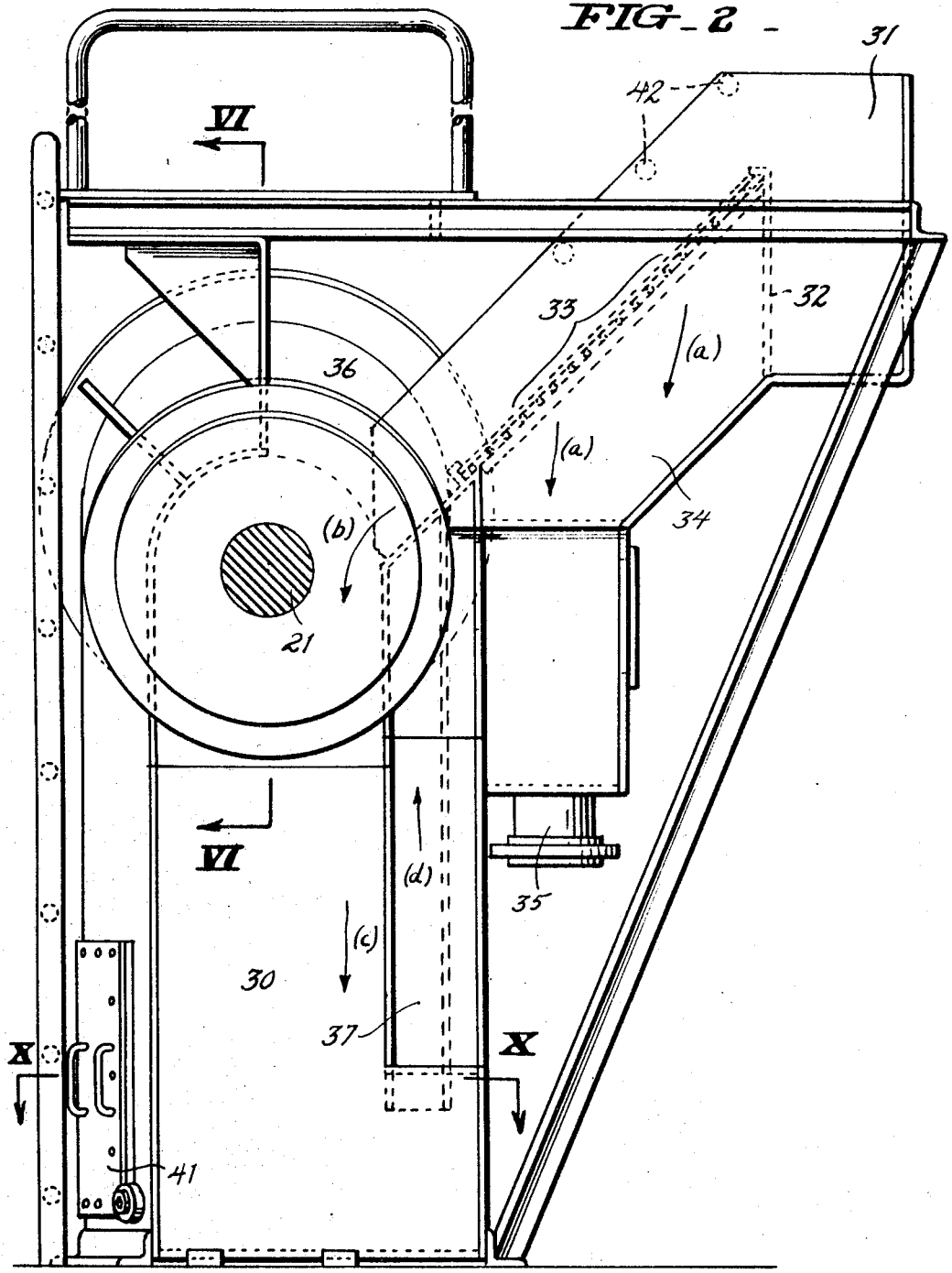

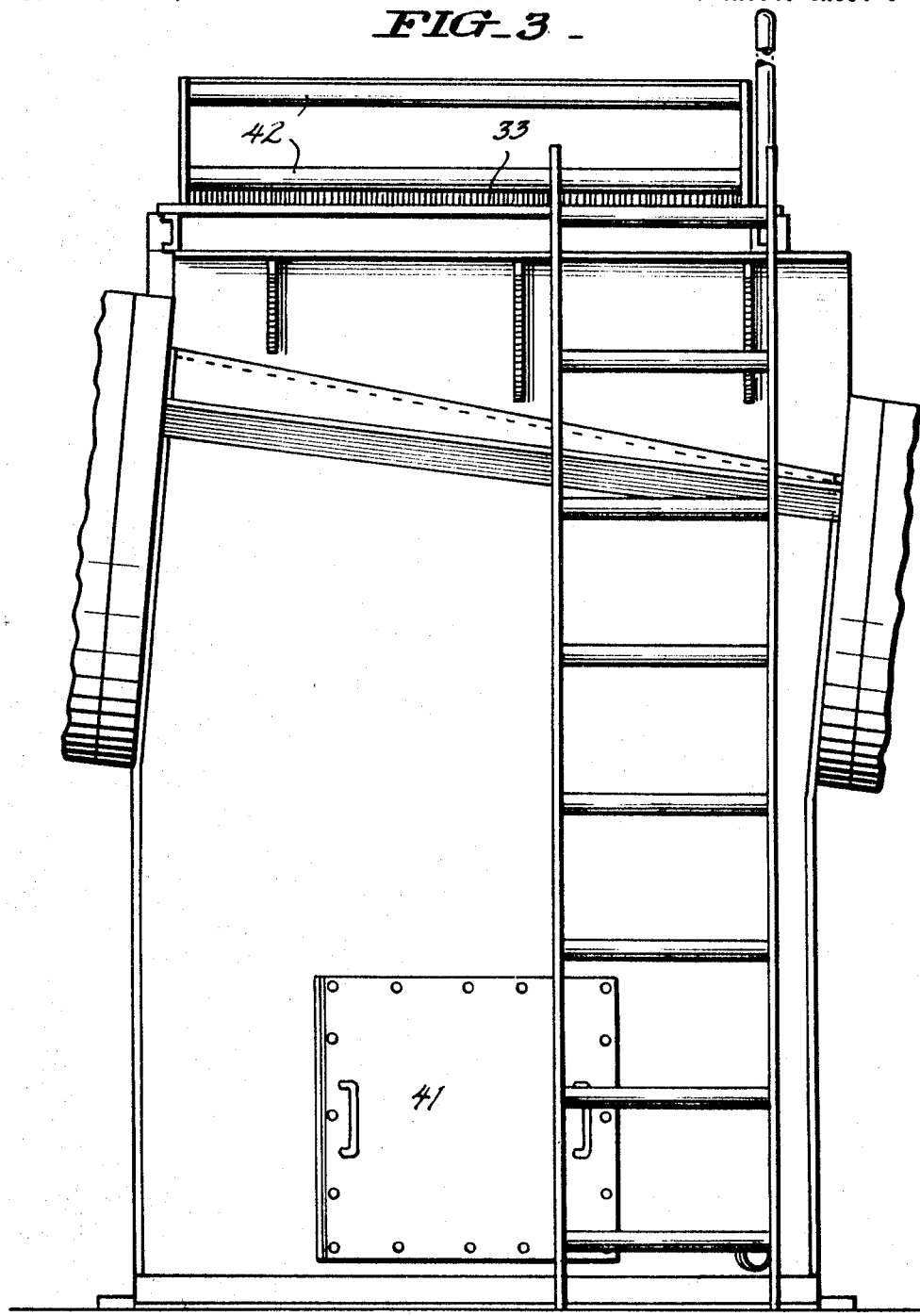

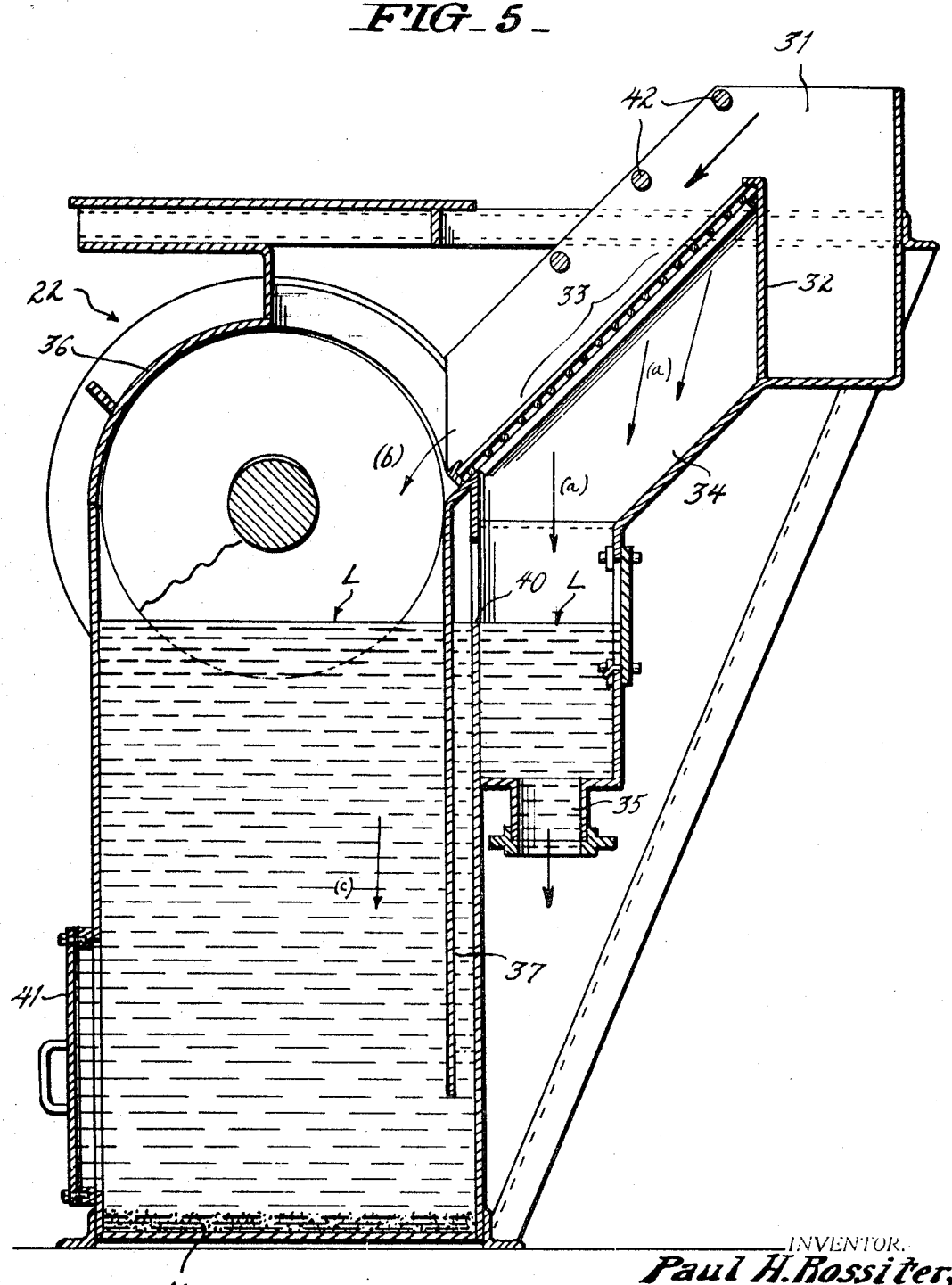

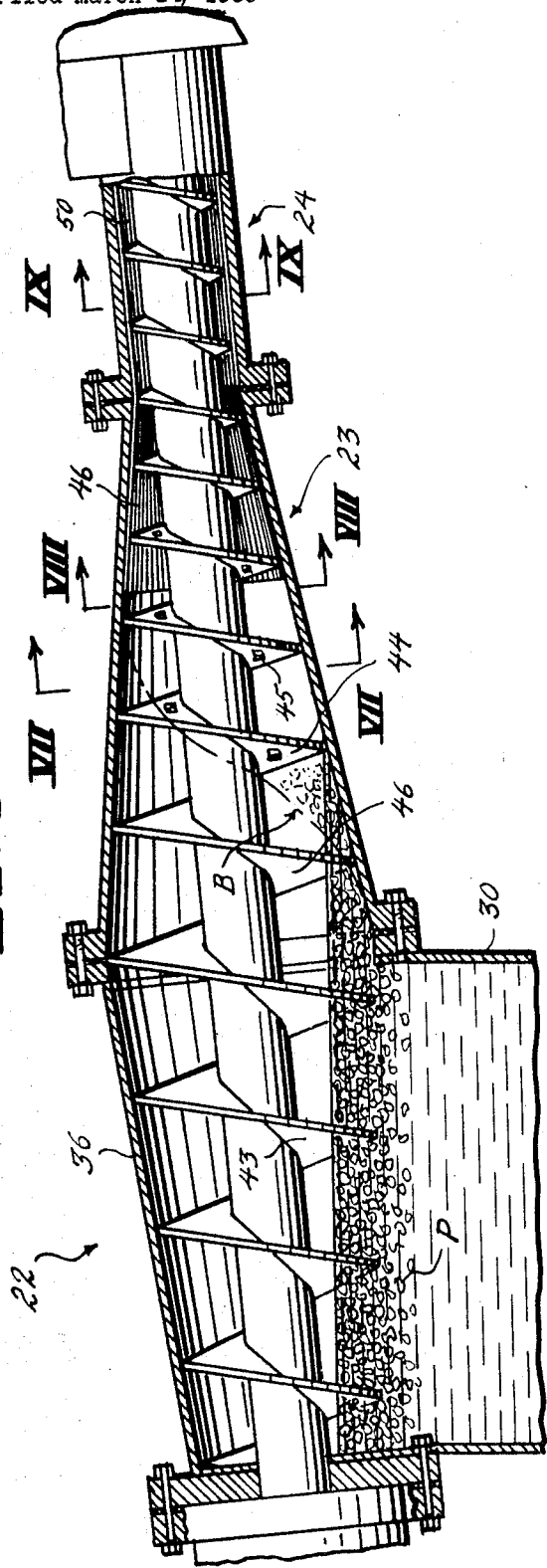

Aug. 5, 1969   P. H. ROSSITER   3,459,121
SLURRY FEEDER
Filed March 14, 1966   7 Sheets-Sheet 7
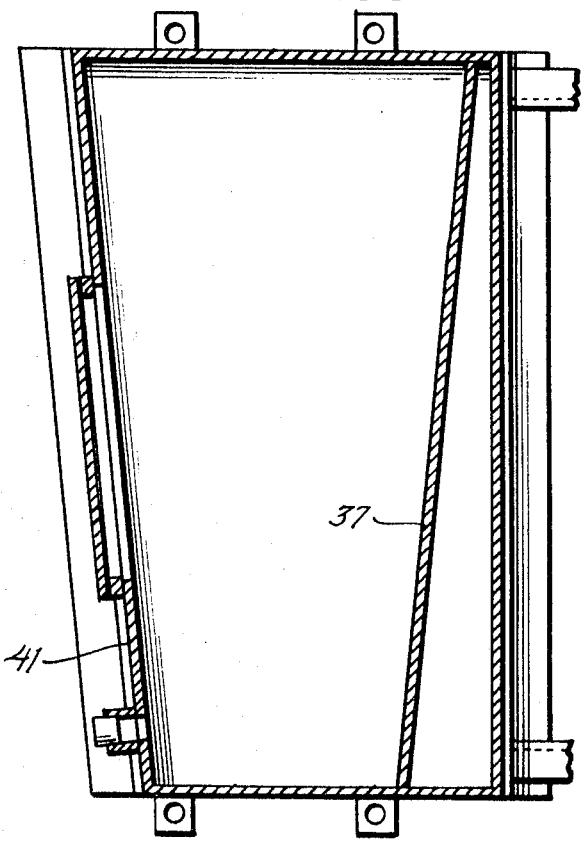
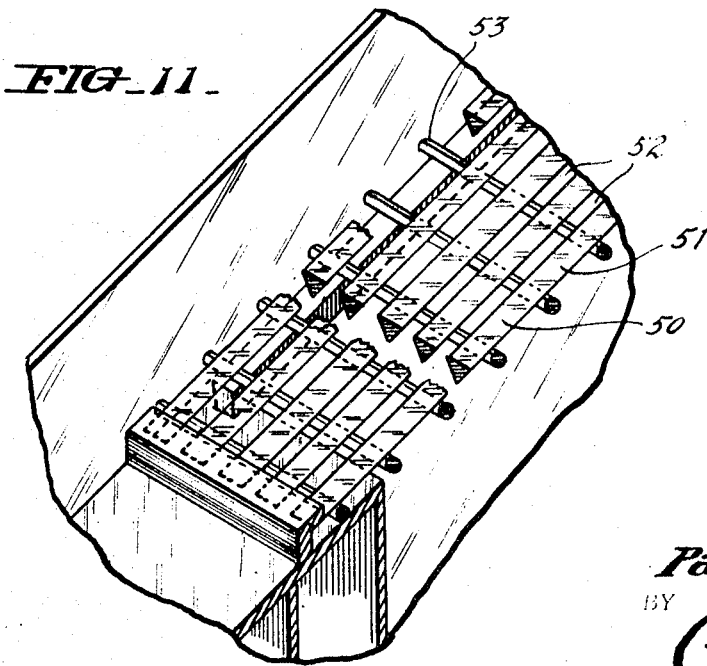
INVENTOR.
Paul H. Rossiter,
BY
Paul & Paul
ATTORNEYS.

United States Patent Office 3,459,121
Patented Aug. 5, 1969

3,459,121
SLURRY FEEDER
Paul H. Rossiter, Paoli, Pa., assignor to Welding Engineers, Inc., Norristown, Pa., a corporation of Delaware
Filed Mar. 14, 1966, Ser. No. 534,029
Int. Cl. B30b 9/12, 9/14, 9/18
U.S. Cl. 100—117         15 Claims

ABSTRACT OF THE DISCLOSURE

An apparatus is provided wherein a liquid containing buoyant solids is fed into a tank-type container, the buoyant solids tending to rise to the liquid level of the container, wherein a worm advances solids from the vicinity of the liquid level toward a squeezing section, wherein liquid is squeezed from the solids. The solids are then extruded, with pressure being applied to compact the solids. A novel feeding means is provided, wherein liquid and solids are delivered to the container from a point above the liquid level in the container, passing across an angularly disposed straining member. The container is constructed to contain a predetermined liquid volume at all times, such that liquid passes downwardly through the container, around a separator member and upwardly over a weir of predetermined height and then to discharge.

---

This invention relates to a slurry feeder particularly suited for the removal of any liquid from any solids which float in such liquid, such as the removal of water from rubber crumb, for example. In the description which follows, water and rubber will be referred to in the interest of simplicity, without limiting the scope of the invention to those materials.

Reference is made to my issued U.S. Patent No. 3,035,306, granted May 22, 1962, over which this is an improvement, which shows a dewatering means for plastic materials including rubber and the like. The apparatus in accordance with this invention is a slurry feeder which greatly increases the material handling capacity of a dewaterer of the type disclosed in my aforementioned issued U.S. patent.

As is disclosed in my aforementioned issued U.S. patent, a dewatering extruder is provided which has a barrel in which the dewatering procedures occur. The barrel is provided with an upwardly-extending feed opening, through which the feed flows in a downward direction for processing within the barrel.

It is an object of this invention to provide a feeding mechanism of radically improved performance as compared to the feed opening just referred to.

Further, as is shown in Fig. 7 of my issued U.S. Patent No. 3,035,306, the water that has been removed from the rubber crumb is caused to flow downwardly and then upwardly and out over a weir while any buoyant solids are either screened out or are separated by floating. However, the velocity of flow of the water in an apparatus of that type tends to become so high that it tends to carry away floatable solids. In accordance with this invention, it is possible to keep this linear velocity down, so that the buoyant effect of the crumb exceeds the downwardly directed force due to water velocity. While the apparatus according to Fig. 7 of my issued patent could be modified by providing a larger cross-section, this would be extremely expensive when one is dealing with a feed material containing a great preponderance of free water such, for example, as 98% water and 2% solids all of which is to be converted to approximately 12% water content prior to extrusion.

Other devices, such as vacuum filters and vibrating screens, have heretofore been provided for dewatering. However, these tend to become troublesome factors in the process line. Screens tend to fill and plug and to cause erratic changes in the moisture control of the material discharged.

Accordingly, it is an object of this invention to provide an apparatus for removing and handling large quantities of free water in a slurry containing a small amount of buoyant solids, without causing erratic changes in the moisture control of the material discharged and providing for uniform acceptance of the material as it is fed.

It is another object of this invention to provide an apparatus which automatically smooths out any surges of feed rate, and which accepts and feeds into the squeezing portion of the apparatus a substantially constant quantity of solids per unit of time.

Other objects and advantages of this invention will further become apparent hereinafter and in the drawings of which:

FIG. 1 is a view in side elevation showing one form of apparatus in accordance with this invention;

FIG. 2 is an enlarged sectional view taken as indicated by the lines and arrows II—II which appear in FIG. 1;

FIG. 3 is a side view of the apparatus shown in FIG. 2, looking from the left toward the right;

FIG. 4 is a plan view of the slurry feeding portion of the apparatus appearing in FIG. 2, other portions of the apparatus being broken away;

FIG. 5 is a sectional view taken as indicated by the lines and arrows V—V which appear in FIG. 1;

FIG. 6 is an enlarged sectional view showing the interior construction of the barrel and worm sections in the dewatering apparatus, together with an upper portion of the slurry feeding container;

FIGS. 7, 8 and 9 are sectional views taken as indicated by the lines and arrows VII—VII, VIII—VIII and IX—IX respectively, which appear in FIG. 6;

FIG. 10 is an enlarged sectional view taken as indicated by the lines and arrows X—X which appear in FIG. 2; and FIG. 11 is an enlarged view in perspective showing a portion of the screening apparatus comprising a part of the slurry feeding portion of the apparatus.

In the description which follows, specific terms will be used for the sake of clarity, but it is to be appreciated that these specific terms are intended only to be descriptive of the particular apparatus selected for illustration in the drawings, and are not intended to define or to limit the scope of the invention which is defined in the appended claims.

Turning now to FIG. 1 of the drawings, the apparatus there shown includes a drive motor 20 driving a shaft 21 which extends into a dewatering apparatus of the type appearing in my aforementioned U.S. Patent No. 3,035,306, which apparatus includes a feed section 22, a squeezing section 23, an extruding section 24, a pressure block attachment 25, and a cutter section 26 having a knife 27 for cutting the finished, dried product in a known manner. The squeezing section 23 is analogous to the section 13 shown in my aforementioned issued patent, and the extruding section 24 is equivalent to the section 14 in the same patent. Further, the pressure block is analogous to the block 57 appearing in Fig. 6 of my aforementioned U.S. patent and is controlled by means of a valve as shown in FIG. 1, for controllably applying pressure to the material just prior to the time that it exits from the extruder section 24.

The slurry feeding device as shown in FIG. 1 differs radically from the upwardly-extending feed pipe 16 of my aforementioned issued U.S. Patent No. 3,035,306. According to this invention a container 30 is provided which is arranged below the feed section 22 and extends along the barrel beneath such feed section 22, preferably substantially the full length of the feed section 22.

Turning to FIGS. 2–5, further details of the slurry feed device are apparent. The number 31 designates a feed box into which the feed material containing great amounts of excess water is introduced. Feed box 31 has a weir 32 over which the feed material flows. Arranged in a sidewardly downwardly inclined position, running downwardly from the top of the weir 32 to the container 30, is a screen 33 over which the feed slurry flows. Because of the screening action, some free water is separated from the solids and drops in the direction indicated by the arrows $a$ in FIGS. 2 and 5, flowing through a drain box 34 and out an exit pipe 35. The unscreened portion of the slurry flows in the direction indicated by the arrow $b$ in FIGS. 2 and 5, downwardly beyond the screen 33 and into the container 30. Because of the action of the worm flights within the barrel 36 of the feed section 22, buoyant solids which are floating on top of the liquid in the container 30 are picked up and advanced along toward the squeezing section 23, while separated water flows downwardly in the container 30 in the direction indicated by the arrow $c$ in FIGS. 2 and 5. An angled plate 37 is provided (see also FIG. 10), forming a divider in the container 30 and causing the water to flow downwardly as indicated by the arrow $c$, then upwardly as indicated by the arrow $d$, and then out over the top of a weir 40 and out the exit pipe 35. The weir 40, as will be apparent, controls the level of liquid and slurry within the container and maintains it at a proper level with respect to the lower surfaces of the worm flights within the feed section 22.

FIGS. 2, 3 and 5 show a drain door 41 for removing solids such as heavy metals M which are separated by the apparatus in accordance with this invention; FIG. 3 also shows in its upper portion the screen 33 and associated parts.

Referring to FIG. 4, the nature of the screen 33 will further become apparent. Its width is substantially equal to the length of the feed section 22. Brace bars 42 are provided for maintaining proper spacing and alignment of the parts of the screen, notwithstanding the substantial stresses applied by the heavy volumes of water that are handled by the apparatus.

Turning to FIG. 5 of the drawings, the level L of liquid and slurry as provided by the weir 40 is more clearly apparent.

FIG. 6 shows that the flights 43 in the feed section 22 are all so arranged that their lower peripheries are substantially horizontally aligned and are all approximately equally submerged in the water in the container 30. This is of importance because the rubber particles P are floating on the liquid and even if surges of feed are experienced, the worm flights 43 can accept only up to a maximum amount of solids per unit of time. If a surge is experienced which tends to exceed that maximum, the excess solids are merely pushed temporarily down into the water in the container 30, as appears in FIG. 6, thus providing an automatic cut-off at the maximum feed rate, since some of the particles are too deeply submerged to be acted upon by the worm flights. This, as will be apparent, is preferably designed to be the maximum feed rate that the ultimate extrusion section 24 can accept. Of course, once the surge has been completed, the excess solids gradually float toward the top and are readily and uniformly accepted by the forwarding capacity of the worm flights 43.

As will be apparent, the worm flights 44 in the squeezing section 23 are progressively decreased in diameter, to conform to the tapered form of their housing, and some of these flights are provided with generally rectangularly shaped openings 45 which permit rearward flow of the water that is being squeezed out of the solids. Near the exit end of the squeezing section 23 are a multiplicity of substantially parallel bars 46 (see also FIG. 8), which tend to oppose rotary movement of the material and tend to cause it to flow in a more axial direction as the ultimate squeezing pressures are applied.

The line B in FIG. 6 indicates schematically the contour along which the particles P, skimmed off the liquid surface by flights 41, are accumulated in the squeezing section 23.

The extruder section 24 that is shown in FIG. 6 serves to eliminate final quantities of water from the resulting mix, in substantially the manner described in my aforementioned issued patent. This extruder, however, may be provided with longitudinally arranged, substantially parallel bars 50 which serve to straighten out the movement of the material as it flows along the extruding section 24.

FIG. 11 shows details of the preferred form of screen appearing in the feed section in the preceding figures. Preferably, in order to eliminate clogging, this screen is not only steeply inclined but is composed of a plurality of parallel bars 50 each aligned with the path of flow and each of which is triangular in section. Each bar 50 has an upper flat surface 51, all of such surfaces being substantially parallel to each other and arranged in a common plane. the bottom portions of the triangles are the angled portions, as will be clearly apparent in FIG. 11. It has been found with this construction that the particles have no tendency to clog in the intervening spaces 52. As will be observed, the triangular parallel members 50 are supported on transverse, spaced, round bars 53.

The apparatus in accordance with this invention provides the advantages of a non-clogging screen structure which allows a maximum quantity of water and solids to pass, and further enhances uniformity of operation. The provision of a container which extends substantially the entire length of the feed section of the dewaterer allows for a minimum linear velocity of the water downwardly, because of the provision of a large area. This provides a very large throughput capacity, particularly where the feed material contains a great amount of water in proportion to the amount of floatable solids. The long hopper feed, running partially submerged, automatically compensates for surges of feed and provides a uniform product which can be produced with astonishingly great capacity in comparison with dewatering machines heretofore available. Moreover, in the barrel of the apparatus as shown in the drawings, great savings in manufacturing costs are achieved by eliminating hard facing, by allowing large clearances, and by providing bars which cost much less than machine slots which have been considered necessary heretofore.

Although reference has been made in the foregoing specification to the separation of water from rubber, it will be appreciated that this invention applies broadly to the separation of any liquid from any solid which floats on the liquid. It is to be understood expressly that, throughout this specification and in the claims, this meaning is to be accorded to the expression "dewatering."

Although the drawings and description refer to a slurry feeder as being connected to a dewatering machine ultimately feeding to an extruder, it will be appreciated that in some circumstances the slurry feeder has advantage when connected to a feed section which feeds to any other kind of dewatering apparatus.

The following is claimed:

1. In an apparatus for dewatering a feed material containing solid mouldable material and free water, which material floats on water, which apparatus includes a barrel having a squeezing means and an internally operating conveying means for advancing said solid material continuously along to said squeezing means, a slurry feeder which comprises means forming a container arranged below and extending along said barrel, said container providing a liquid level above the bottom of said conveying means, and means for continuously feeding said feed material including said feed water into said container at a sidewardly directed angle to the path of advancement of said conveying means, wherein the feed means includes a downwardly inclined screen and a means for introducing said feed substantially all along the length of said screen.

2. The apparatus defined in claim 1 wherein said screen comprises a plurality of substantially parallel bars all inclined downwardly in the direction of in-feed flow, with substantially uninterrupted free space between said bars at a level above said container.

3. The apparatus defined in claim 2 wherein said bars are substantially triangular in cross-section.

4. The apparatus defined in claim 3 wherein a flat face of the triangle is the upper face of the bar.

5. The apparatus defined in claim 3 wherein said bars are supported on transversely extending, spaced-apart round bars.

6. In an apparatus for dewatering a feed material containing solid mouldable material and free water, which apparatus includes a barrel having a squeezing means and an internally operating conveying means for advancing said solid material continuously along to said squeezing means, a slurry feeder which comprises means forming a container arranged below and extending along said barrel, said container providing a liquid level above the bottom of said conveying means, and means for continuously feeding feed material including free water, into said container from a lateral direction above the liquid level in the container, said feeding means being offset from the container and disposed above the liquid level in the container, wherein divider means is provided in said container for causing the liquid in said container to flow downwardly from the buoyant solids for separation from said solids.

7. The apparatus defined in claim 6 wherein an outlet weir is provided in said container and wherein said divider means causes said separated liquid to flow upwardly and out over said weir.

8. In an apparatus for dewatering a feed material containing solid mouldable material and free water, which apparatus includes a substantially horizontally disposed barrel having a multiplicity of worm flights arranged for rotation about an elongated axis and forming a feed section for advancing said solid material continuously along to a squeezing section, a slurry feeder which comprises means forming a container arranged below and extending along said barrel beneath said feed section, said container providing a liquid level above the bottom of said worm flights in said feed section whereby said worm flights are at least partially submerged in the slurry in said container and operate to skim off the floating solids to advance them toward said squeezing section, and means for continuously feeding said feed material including said free water from a level laterally above the liquid level in the container at a sidewardly directed oblique angle to the path of advancement of said conveying means.

9. In an apparatus for dewatering a feed material containing solid mouldable material and free water, which apparatus includes a barrel having a multiplicity of worm flights arranged for rotation about an elongated axis and forming a feed section for advancing said solid material continuously along to a squeezing section, a slurry feeder which comprises means forming a container arranged below and extending along said barrel beneath said feed section, said container providing a liquid level above the bottom of said worm flights in said feed section whereby said worm flights are at least partially submerged in the slurry in said container and operate to skim off the floating solids to advance them toward said squeezing section, and means for continuously feeding said feed material including said free water from a level laterally above the liquid level in the container at a sidewardly directed angle to the path of advancement of said conveying means, wherein the worm flights of said feed section are all substantially equally deeply submerged in said liquid.

10. In an apparatus for dewatering a feed material containing solid mouldable material and free water, which apparatus includes a barrel having a multiplicity of worm flights arranged for rotation about an elongated axis and forming a feed section for advancing said solid material continuously along to a squeezing section, a slurry feeder which comprises means forming a container arranged below and extending along said barrel beneath said feed section, said container providing a liquid level above the bottom of said worm flights in said feed section whereby said worm flights are at least partially submerged in the slurry in said container and operate to skim off the floating solids to advance them toward said squeezing section, and means for continuously feeding said feed material including said free water from a level laterally above the liquid level in the container at a sidewardly directed angle to the path of advancement of said conveying means, wherein said axis is upwardly inclined from said feed section to said squeezing section.

11. In an apparatus for dewatering a feed material containing solid mouldable material and free water, which apparatus includes a barrel having a multiplicity of worm flights arranged for rotation about an elongated axis and forming a feed section for advancing said solid material continuously along to a squeezing section, a slurry feeder which comprises means forming a container arranged below and extending along said barrel beneath said feed section, said container providing a liquid level above the bottom of said worm flights in said feed section whereby said worm flights are at least partially submerged in the slurry in said container and operate to skim off the floating solids to advance them toward said squeezing section, and means for continuously feeding said feed material including said free water from a level laterally above the liquid level in the container at a sidewardly directed angle to the path of advancement of said conveying means, wherein said squeezing section includes a tapered housing and tapered worm flights which taper toward the exit from said squeezing section.

12. The apparatus defined in claim 11 wherein a plurality of elongated guides are provided on the interior of said housing in said squeezing section, and are spaced apart around the outer periphery of said worm flights.

13. In an apparatus for dewatering a feed material containing solid mouldable material and free water, which material floats on water, which apparatus includes a barrel having a squeezing means and an internally operating conveying means for advancing said solid material continuously along to said squeezing means, a slurry feeder which comprises means forming a container arranged below and extending along said barrel, said container providing a liquid level above the bottom of said conveying means, and means located above the liquid level in the container for simultaneously continuously feeding feed material including free water, into said container and straining feed material, including free water, which is being fed to the container.

14. The apparatus defined in claim 13 wherein a plug valve is controllably mounted downstream of said squeezing section and arranged to impede movement of said material.

15. In an apparatus for dewatering a feed material containing solid mouldable material and free water, which material floats on water, which apparatus includes a substantially horizontally disposed barrel having a squeezing means and internally operating conveying means for advancing said solid material continuously along to said squeezing means, a slurry feeder which comprises means forming a container arranged below and extending along said barrel, said container providing a liquid level above the bottom of said conveying means, and single inlet means for continuously feeding feed material, including free water, from a level laterally above the liquid level in the container into said container at a sidewardly directed oblique angle to the path of advancement of said conveying means.

(References on following page)

References Cited

UNITED STATES PATENTS

| | | |
|---|---|---|
| 366,165 | 7/1887 | Gray. |
| 2,184,248 | 12/1939 | Bonotto _____ 100—147 X |
| 2,761,799 | 9/1956 | Schroeder _____ 100—145 X |
| 3,035,306 | 5/1962 | Rossiter _____ 100—37 |
| 3,240,169 | 3/1966 | Cunningham _____ 100—145 X |
| 3,135,193 | 6/1964 | Hunt _____ 100—117 |
| 3,188,942 | 6/1965 | Wandel _____ 100—117 X |
| 3,375,776 | 4/1968 | Dyson _____ 100—117 X |

FOREIGN PATENTS 634,303   11/1927   France.

BILLY J. WILHITE, Primary Examiner

U.S. Cl. X.R.

100—148